United States Patent [19]

Hu et al.

[11] Patent Number: 6,157,731
[45] Date of Patent: Dec. 5, 2000

[54] SIGNATURE VERIFICATION METHOD USING HIDDEN MARKOV MODELS

[75] Inventors: Jianying Hu, Westfield; Ramanujan S. Kashi, Bridgewater; Winston Lowell Nelson, Morristown; William Turin, East Brunswick, all of N.J.

[73] Assignees: Lucent Technologies Inc., Murray Hill; AT&T Corp., Basking Ridge, both of N.J.

[21] Appl. No.: 09/108,892

[22] Filed: Jul. 1, 1998

[51] Int. Cl.[7] ................................................ G06K 9/00
[52] U.S. Cl. .......................................... 382/119; 382/123
[58] Field of Search .................................... 382/115, 116, 382/119–123, 168, 170, 171, 186–191, 195, 190, 224–229; 704/256, 239–243

[56] References Cited

U.S. PATENT DOCUMENTS

| | | | |
|---|---|---|---|
| 4,400,788 | 8/1983 | Myers et al. | 364/513 |
| 4,587,670 | 5/1986 | Levinson et al. | 381/43 |
| 4,783,804 | 11/1988 | Juang et al. | 381/43 |
| 5,226,091 | 7/1993 | Howell et al. | 382/3 |
| 5,509,104 | 4/1996 | Lee et al. | 395/2.65 |
| 5,524,240 | 6/1996 | Barbara et al. | 395/600 |
| 5,526,465 | 6/1996 | Carey et al. | 395/2.59 |
| 5,559,897 | 9/1996 | Brown et al. | 382/186 |
| 5,710,916 | 1/1998 | Barbara et al. | 395/609 |

FOREIGN PATENT DOCUMENTS 409198083   7/1997   Japan ................... G10L 3/00

OTHER PUBLICATIONS

Senior et al. "Duration Modeling Results for an On–Line Handwriting Recognizer." 1996 IEEE International Conference on Acoustics, Speech, and Signal Processing, vol. 6. pp. 3482–3485, May 1996.

Y. Sato, et al. "Online Signature Verification Based on Shape, Motion, and Writing Pressure", *Proc. 6th of ICPR* (1982) 823–826 (IEEE Publication No. CH 1801–0/82/0000/0823).

L. R. Rabiner, "A Tutorial on Hidden Markov Models and Selected Applications in Speech Recognition," *Proc. of the IEEE 77* (Feb. 1989) 257–284.

L. Yang et al. "Application of Hidden Markov Models For Signature Verification," *Pattern Recognition* 28 (1995) 161–170.

*Primary Examiner*—Bhavesh Mehta
*Attorney, Agent, or Firm*—Martin I. Finston

[57] ABSTRACT

A signature verification method involves segmenting a smoothed and normalized signature and, for each segment, evaluating at least one local feature, thereby to obtain a feature-value vector. The method further includes computing the likelihood that the segments having the observed sequence of feature values were generated by a particular hidden Markov model, such model comprising a sequence of states having duration probabilities and feature-value histograms. In one aspect, the invention involves explicit state-duration modeling to account for duration in the respective states underlying the unknown signature. In another aspect, the invention involves computing a measure of signature complexity, and setting the number of states of the hidden Markov model according to such complexity measure.

19 Claims, 4 Drawing Sheets

FIG. 1
(PRIOR ART)

FIG. 2
PRE PROCESSING

FIG. 5
STATE i MODEL

COMPONENTS OF AN OBSERVATION VECTOR

SIGNATURE VERIFICATION METHOD USING HIDDEN MARKOV MODELS

FIELD OF THE INVENTION

This invention relates to methods for verifying that a digitally sampled, handwritten signature is genuine; i.e., that the signer is who he purports to be. More particularly, the invention relates to those verification methods that rely, at least in part, on local features of the signature.

ART BACKGROUND

Signature verification is attracting increasing interest as a method for establishing the authority of a person to complete an automated transaction, gain control of a computer, gain physical entry to a restricted area, or the like. The person seeking permission to complete the transaction, etc., provides a sample of his signature, which is compared with a stored record. If the sample signature agrees sufficiently with the stored information, it is accepted as genuine.

In on-line methods of signature verification, the sample signature is made using digitizing apparatus, such as an instrumented tablet. The result is a digitized sample stream, which can be processed to extract characterizing information that can be stored compactly. One way to extract characterizing information is to compute functions, referred to as features, that map the sampled signature onto numerically valued single numbers or vectors. Thus, each sample signature is characterized by a corresponding set of feature values. During verification, these feature values are compared with stored, reference values of the same features, which have been computed on a reference set of signatures provided during an earlier registration procedure.

Broadly speaking, features fall into two categories: local features, and global features. Global features, such as total time and total length of the signature, are calculated for entire signatures or for substantial and distinct signature portions, such as contiguous pen-down portions. Local features are calculated for smaller portions, typically substantially smaller than a single alphanumeric character, such as individual sample points or equal-length (in time or space) collections of sequential sample points. Although local features are more sensitive to handwriting variations than are global features, they also tend to require more computer resources for processing and storage. Therefore, an appropriate feature set often includes a combination of global and local features, chosen for an advantageous trade-off between discriminative power and compactness.

A given pair of signatures by the same person seldom coincides completely. More typically, the signatures differ in such a way that small, localized elongations or compressions are needed to bring into registry the segments on which corresponding local features are computed. Therefore, it is often desirable, when comparing local features, to employ a technique in which the comparison is made elastically. One such technique is Dynamic Warping, as described, for example, in Y. Sato et al., "Online Signature Verification Based on Shape, Motion, and Writing," in *Proc. 6$^{th}$ of ICPR* (1982) 823–826 (IEEE Publication No. CH 1801-0/82/0000/0823).

Another comparison technique, which also has the inherent ability to deal with differences of this kind, uses Hidden Markov Modeling (HMM). HMM is described generally, and with reference to applications for speech recognition, in L. R. Rabiner, "A Tutorial on Hidden Markov Models and Selected Applications in Speech Recognition," *Proc. of the IEEE* 77 (February 1989) 257–284. An application of HMM to signature verification is described in L. Yang et al., "Application of Hidden Markov Models for Signature Verification," *Pattern Recognition* 28 (1995) 161–170.

Briefly, the signature is characterized by a sequence of observables. For signatures of each class (i.e., signatures by each registered human subject), a respective hidden Markov model is posited to underlie the signing process. This model consists of a finite sequence of states. Associated with each state is a probability distribution for observations generated in that state. Also associated with each state (except the last) is a probability of transition into the next state in the next time step. In the method of Yang et al., a self-transition probability is also associated with each state. The hidden Markov model is constructed from a set of reference signatures.

For any given signature, the signing process must pass through all of the states. However, the number of observables is generally much greater than the number of states. Therefore, at least some of the states will endure for more than one time step, and thus will experience at least one self-transition. This variability in the state duration provides the flexibility, referred to above, for dealing with variations between signatures by the same person.

A given signature is verified by calculating the probability that it was generated by the hidden Markov model of its purported class. This probability depends on the transition probabilities and on the state-specific observation-probability distributions. If the calculated probability satisfies a threshold test, the signature is deemed authentic.

An ideal signature verification method is capable of perfect discrimination between genuine signatures and forgeries. That is, the rate of false acceptances (of forged signatures) and the rate of false rejections (of genuine signatures) are ideally both zero. However, because of human variability in making signatures, it is rare to find a criterion that discriminates perfectly, in all cases, between those signatures that are genuine and those that are forged. Therefore, in practice, a moderate rate of errors of both types must generally be tolerated.

Better understanding of human behavior and kinesiology in the writing of signatures can lead to better modeling of the signing process and, in turn, to greater accuracy in signature verification.

In particular, there is room to improve HMM methods, as they are currently known, by more closely modeling certain behavioral peculiarities of the signing process.

SUMMARY OF THE INVENTION

The conventional HMM method of signature verification, as described, e.g., in Yang et al., involves implicit duration modeling. That is, each successive time step for which the model endures in a given state incurs a further self-transition having a less-than-one probability. As a consequence, the duration probability is an exponentially decreasing function of time.

It has been our observation, however, that signing behavior is not accurately characterized by such a decaying duration probability. We believe that the signing process is modeled more accurately by a duration probability that is constant or slowly varying within a range bounded by minimum and maximum duration values, and that drops to substantially smaller values, or even to zero, outside of that range. Instead of implicit duration modeling, we use explicit state-duration modeling (ESDM) to account for such behavior. In explicit duration modeling, the duration probabilities are made to reflect the actual distributions of durations observed in the reference set.

In one aspect, our invention is a signature verification method that involves digitally sampling at least one unknown signature, thereby to produce raw signature data; processing the raw signature data, thereby to produce smoothed and normalized signature data; dividing the processed signature data into segments; and for each segment, evaluating at least one local feature, thereby to obtain a sequence of observables, which we refer to as a feature-value vector.

The invention further includes computing the likelihood that the segments having the observed sequence of feature values were generated by a particular hidden Markov model. Such a model comprises a sequence of states having duration probabilities and feature-value histograms.

The invention further comprises applying the computed likelihood in a threshold test, and, at least partly in response to the threshold test, issuing a signal indicative of whether or not the signature is accepted as genuine.

The invention differs from HMM methods of the prior art, inter alia, in the computation of the likelihood that the feature-value vector was generated by a particular model. In the likelihood computation, ESDM is used to account for duration in the respective states underlying the unknown signature.

In a second aspect, our invention is a method for constructing a template Hidden Markov model to be used in signature verification. Two or more training signatures are digitally sampled to produce raw signature data. For each sampled training signature, processing steps similar to those listed above are carried out to provide at least one vector of feature values.

In response to the evaluation of features, at least some of the model parameters, including feature-value histograms, are re-evaluated. The re-evaluated model parameters are stored.

In contrast to HMM methods of the prior art, ESDM is used to represent the duration probabilities of the template model according to distributions of duration observed in the training signatures.

In a third aspect, our invention is a method for constructing a template hidden Markov model to be used in signature verification, as described above, but with or without the use of ESDM. In contrast to HMM methods of the prior art our method includes computing a measure of the complexity of at least one of the training signatures, and in accordance with the computed measure, determining a corresponding number of states for the template hidden Markov model. Thus, for signatures of a given class (i.e., belonging to a particular person), the number of states is fixed. However, this number may differ between classes, as a result of interpersonal variability in signature complexity.

DETAILED DESCRIPTION

Figure 1:
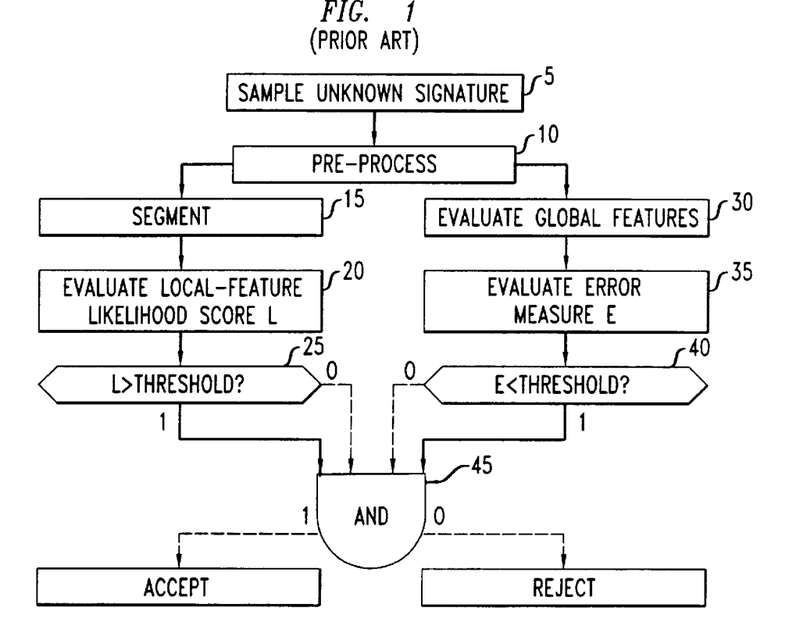
FIG. 1 is a flow chart illustrating, at a general level, a signature verification method that combines matching of local features with matching of global features.

Turning to FIG. 1, step 05 of an exemplary signature verification procedure is to obtain a digital sample of the unknown signature. Various instrumented devices are known for providing such a sample. One such device is described in U.S. Pat. No. 5,463,388, issued on Oct. 31, 1995 to R. A. Boie et al. under the title "Computer Mouse or Keyboard Input Device Utilizing Capacitive Sensors."

The sampled signature is subjected to subsequent processing steps, which are typically carried out by a digital computing device operating under the control of an appropriate software program. At step 10, pre-processing is performed to clean, smooth, and normalize the signature. At step 15, the signature is divided into a plurality of segments, as explained in greater detail below. One or more observables are associated with each of these segments. The corresponding observed values are assembled into one or more vectors of local feature values.

At step 20, at least one such feature-value vector is compared with a signature template. As we explain in greater detail below, this template is a hidden Markov model of the signing process. This comparison step results in a score L that expresses the likelihood that the feature-value vector was generated by the particular model represented by the signature template. At step 25, the score L is compared with a threshold. (As explained below, this threshold may be differ between classes of signatures.) If the score L is high enough, the signature may accepted as genuine.

Alternatively, as illustrated in the figure, the result of this test may be combined with a test based on global features. In such a case, one or more global features are evaluted, at step 30, on the pre-processed signature. By way of illustration, appropriate global features may include some or all of the following: total signature time, ratio of pen-down time to total time, the respective horizontal and vertical components of velocity and acceleration (exemplarily calculating derivatives using cubic smoothing B-splines), magnitude of path velocity, path-tangent angle of pen motion, rms speed, average horizontal speed, integrated centripetal acceleration, length-to-width ratio, horizontal span ratio, horizontal and vertical centroids, the histogram of the distribution density of the path-tangent angles over eight equal circular sectors, the histogram of the distribution density of the angular changes between the path-tangent angles over four equal circular sectors (both histograms are based on an appropriate partition of the signature), a correlation coefficient between the horizontal and vertical components of pen speed, and the first global moment of the signature. The horizontal span ratio is exemplarily computed as the difference between the maximum and minimum horizontal positions in the signature, expressed as a fraction of the total permitted horizontal space. The correlation coefficient of horizontal and vertical pen-speed components is exemplarily computed as the product of these components, expressed as an absolute value and summed over sampled points.

At step 35, a global error measure E is computed. E is typically a root-mean-square error obtained by taking the difference between each observed global feature value and the corresponding mean value over the set of reference signatures. Each such difference is normalized to the corresponding standard deviation over the reference set, and squared. The sum of these squared terms is the square of E.

At step 40, E is compared to a threshold value, which may vary between signature classes. If E is sufficiently small, the signature may be acceptable as genuine. In the procedure that is illustrated, a logical gating operation 45 permits the signature to be accepted only if it passes both local threshold test 25 and global threshold test 40.

In an alternative, and currently preferred method for combining L and E, these two measures are combined into a single error measure using a Euclidean method by computing their weighted root-mean-square combination. (An appropriate weight may be determined empirically from a representative signature data base.) This single error measure is then compared to a threshold. The likelihood score used in this procedure is not the raw probability, but instead the normalized logarithm of the probability, as we explain in detail below.

Figure 2:
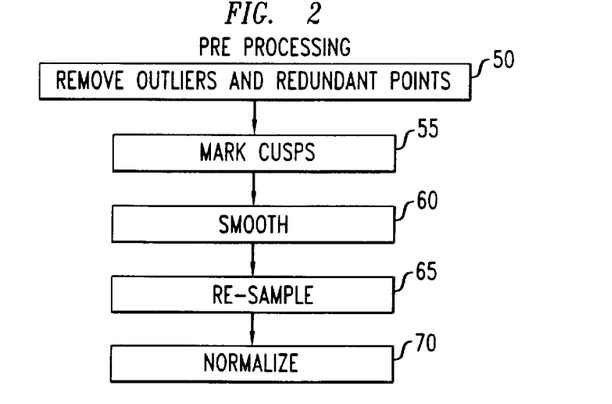
FIG. 2 is a flow chart illustrating a pre-processing procedure for raw signatures that is useful in connection with the present invention.

The pre-processing operation 10 of FIG. 1 is now described in greater detail with reference to FIG. 2. At step 50, isolated points (typically generated by electromagnetic interference during data collection) and redundant points are deleted. At step 55, cusps are detected and marked. At step 60, a smoothing filter, typically a cubic B-spline filter, is applied to the signature. At step 65, the signature is re-sampled at intervals of equal arc length. (Segmentation step 15, shown in FIG. 1, may be identical with this re-sampling step.) During the smoothing and re-sampling steps, cusps are preserved to retain information embodied in those portions of the signature that exhibit sharp changes of direction. At step 70, the signature is normalized.

The purpose of normalization is to remove the effects of translation, rotation, and scale change from the signature. A currently preferred method of normalization is Fourier normalization. The normalization procedure is conveniently described in terms of a representation z of the signature as a curve in the complex plane. The transformed curve $Z=Z_0$, $Z_1, Z_2, \ldots, Z_{M-1}$ is related to the original curve by $Z=Fz$, where F is the Fourier matrix. M is the number of sampled points. If w represents the primitive M-th root of unity $\exp(2\pi i/M)$, then the entry in row j and column k of the matrix F is $w^{jk}$. Translation is accounted for by setting $Z_0$ equal to 0. Rotation and scale are accounted for by dividing the remaining coefficients $Z_1, Z_2, \ldots, Z_{M-1}$ by $Z_1$. The resulting normalized vector of Fourier coefficients is subjected to an inverse Fourier transform to obtain the normalized signature.

Figure 3:
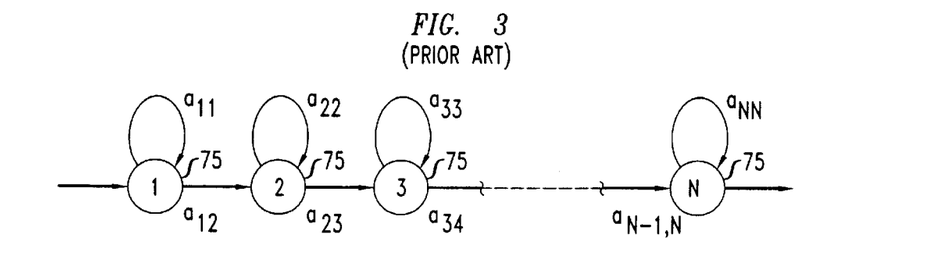
FIG. 3 is a conceptual drawing illustrating a hidden Markov model of the prior art.

HMM methods such as those of L. Yang et al., cited above, use an implicit duration model such as that illustrated in FIG. 3. As shown there, each transition between states 75 has an associated transition probability $a_{12}, a_{23}, \ldots, a_{N-1,N}$, and each state has an associated self-transition probability $a_{11}, a_{22}, \ldots, a_{NN}$. Extended duration in a given state is represented by repeated self-transitions in that state, resulting in a duration probability that decays exponentially.

Figure 4:
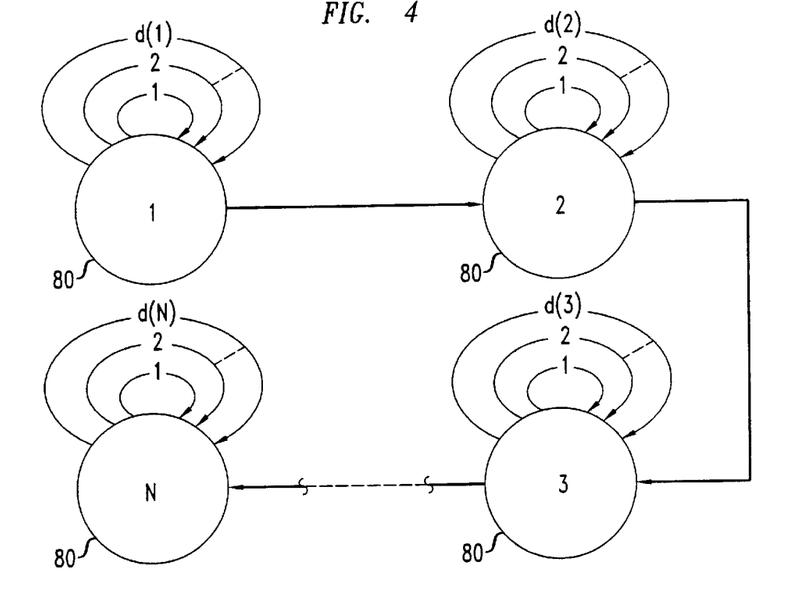
FIG. 4 is a conceptual drawing illustrating a hidden Markov model according to the invention in certain embodiments.

By contrast, we use an explicit duration model, as illustrated schematically in FIG. 4. In our model, there is associated with each state 80 a variable duration d, having a probability distribution $p_1(d), p_2(d), \ldots, p_N(d)$, for states $1, 2, \ldots, N$, respectively. The probability distribution depends explicitly on the distribution of durations in the set of training signatures, as explained in detail below.

Figure 5:
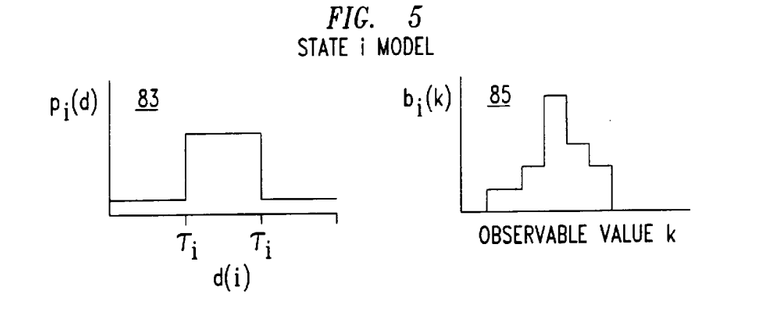
FIG. 5 is a pair of state-conditional histograms, such as are included in a state model according to the invention in certain embodiments. In the figure, the histogram on the left represents state-duration probability, and the histogram on the right represents the distribution of feature values.

The underlying model of a given state (illustratively, state i) is illustrated in FIG. 5. As noted, this model includes probability distribution 83 of the state duration. The model also includes state histogram 85. Each of these histograms (one for each state) represents the statistical distribution $b_1(k), b_2(k), \ldots, b_N(k)$, of the values k that an observable may take while the signing process is in the corresponding state. As we explain below, this distribution takes the form of a histogram, and not a continuous distribution, because we have quantized the possible values of the observable. Also as explained below, the histograms are derived in a training process from the reference signatures.

As noted above, the sequence of values that the observables take on when a given unknown signature is examined is combined into a feature-value vector. This vector is compared with the model of FIG. 4 to compute a score L that expresses the likelihood that the particular sequence of values it represents was generated by that particular model. (There will be a different model for each signature class. When a signature is to be verified, it is compared with the model of the class identified with the person who the signer purports to be.)

The likelihood score is obtained by multiplying the probabilities of events that are assumed to be statistically independent. As is often the case when probabilities are compounded in this fashion, it is convenient to deal with the logarithms of the probabilities, and to compound them by adding logarithms. Accordingly, the following discussion will refer to the log-likelihood score LL We obtain the log-likelihood score LL in two stages. First, a raw log score $LL_0$ is obtained by combining respective probabilities at each transition between successive states, and then $LL_0$ is normalized to LL as explained below. Below, we describe our currently preferred scoring procedure. Those skilled in the art will appreciate that other scoring procedures are known and may be used in this context. Such alternative procedures are also intended to lie within the scope and spirit of the invention.

Figure 6:
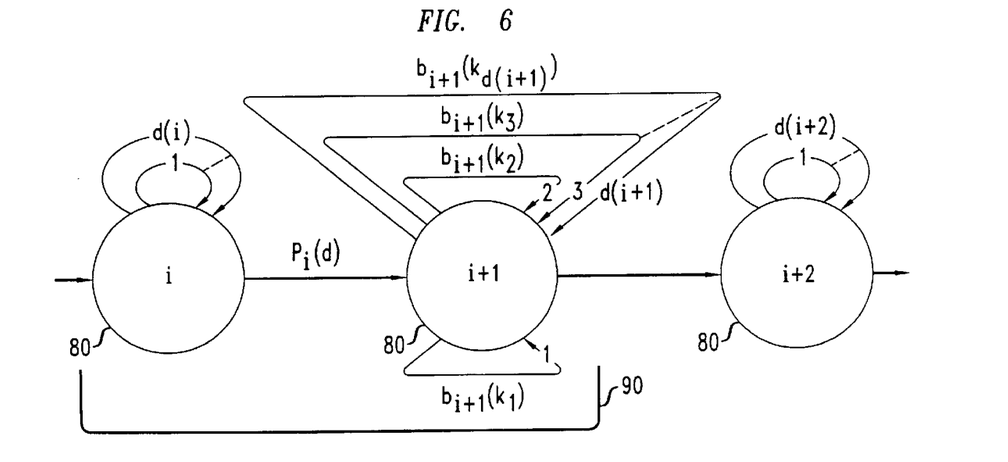
FIG. 6 is a conceptual drawing illustrating the hidden Markov model of FIG. 4, showing details of a transition from state i to state i+1.

One illustrative state transition 90 is shown in detail in FIG. 6. For this transition (from state i to state i+1), the raw log-likelihood score is increased by an additive increment $\Delta L=\log p_i(d)+\log b_{i+1}(k_1)$, where $p_i(d)$ is the duration probability for the leaving state i, and $b_{i+1}(k_1)$ is the probability of the first feature value $k_1$ observed in the entering state i+1, according to the histogram of the entering state. Each later self-transition in state i+1 adds an increment $\log b_{i+1}(k_2)$, $\log b_{i+1}(k_3), \ldots, \log b_{i+1}(k_d)$, respectively, where d is the duration of the state, and while the signing process is in that state, the full sequence of values taken on by the observable is $k_1, k_2, k_3, \ldots, k_d$. (It should be noted in this context that for the last state, the duration is taken from entry into that state to the last sample mapped to that state.)

In our current implementation, there are two sets of observables. One set consists of the inclination angle a of each segment of the signature, in which each segment extends between sampled points most of which are evenly distributed with a separation proportional to the total arc length of the signature (so that each sample signature will have roughly the same number of sample points). Exceptions to the even distribution of sampled points may occur where extra points have been interpolated to preserve cusps. There is broad discretion in choosing the total number of sampled points. By way of example, we use approximately 512 sampled points in our current implementation.

Figure 7:
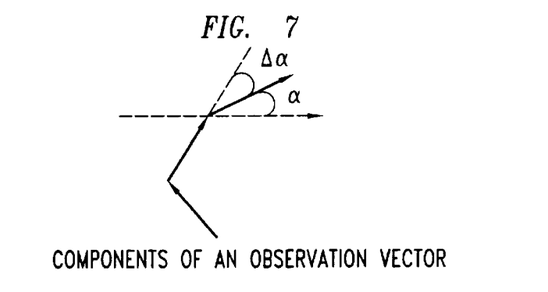
FIG. 7 illustrates two observables that are evaluated in order to provide feature values according to the invention in specific embodiments.

The other set of observables consists of the difference $\Delta\alpha$ between each adjacent pair of inclination angles. The two observables are illustrated in FIG. 7.

We assume that the two sets of observables are statistically independent. Therefore, each observable is quantized according to a respective quantization rule, and each has a respective probability distribution at each state. The joint state-conditional probability for the two observables is simply the product of the respective individual probabilities.

In our current implementation, the duration probability is treated as constant in the interval between two limits, which are separately evaluated in the training phase for each of the states. Outside of that interval, we set the duration probability to a low value. (In order to provide some accommodation for outlying data, we have found it advantageous to use a value substantially less than one, such as 0.0001, rather than to set this probability to zero.) Because of this simple treatment, we can account for the contribution that each duration probability makes to the likelihood score via a simple decision whether or not each state duration lies within the corresponding duration interval.

Figure 8:
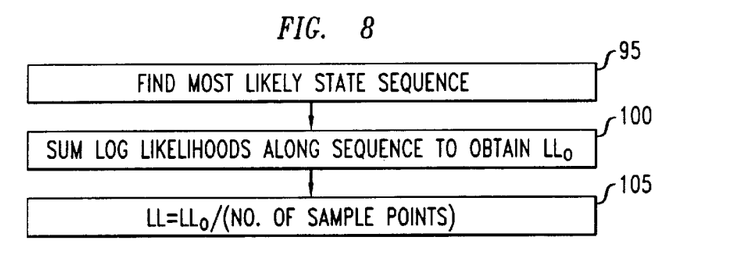
FIG. 8 is a flow chart illustrating certain details of the verification procedure of FIG. 1, when performed in accordance with the invention in certain embodiments.

FIG. 8 shows the steps of the verification procedure summarized in box 20 of FIG. 1. Given the hidden Markov model of the putative class of the unknown signature, the most likely sequence of states is identified, as indicated in step 95 of the figure. That is, the signing process is assumed to begin at the first state and end at the last state, and to pass through all of the states in sequence. What is to be determined is the mapping of observed feature values to states, and thus the duration of each state. That sequence is chosen that maximizes the log-likelihood score.

The well-known Viberbi algorithm is used to search for the most likely state sequence (step 95 of the figure), and to give the accumulated likelihood score for the unknown signature along this best path (step 100). The Viterbi algorithm is described, for example, in L. R. Rabiner et al., *Fundamentals of Speech Recognition*, Prentice Hall, Englewood Cliffs, New Jersey, 1993, pp. 349–352, which is hereby incorporated by reference.

As noted, the total number of observables (of each of the two kinds) is normalized by the total arc length of the signature. However, because the cusp-preserving re-sampling process discussed above tends to introduce slight length changes, this number can still vary somewhat between signatures. To reduce this effect, we normalize the raw log-likelihood score (step 105) by dividing it by the number of sample points.

As noted with reference to box 25 of FIG. 1, the normalized log-likelihood score is compared to a threshold. In our current implementation, this threshold is the mean log-likelihood score over the set of reference signatures, obtained during training.

Figure 9:
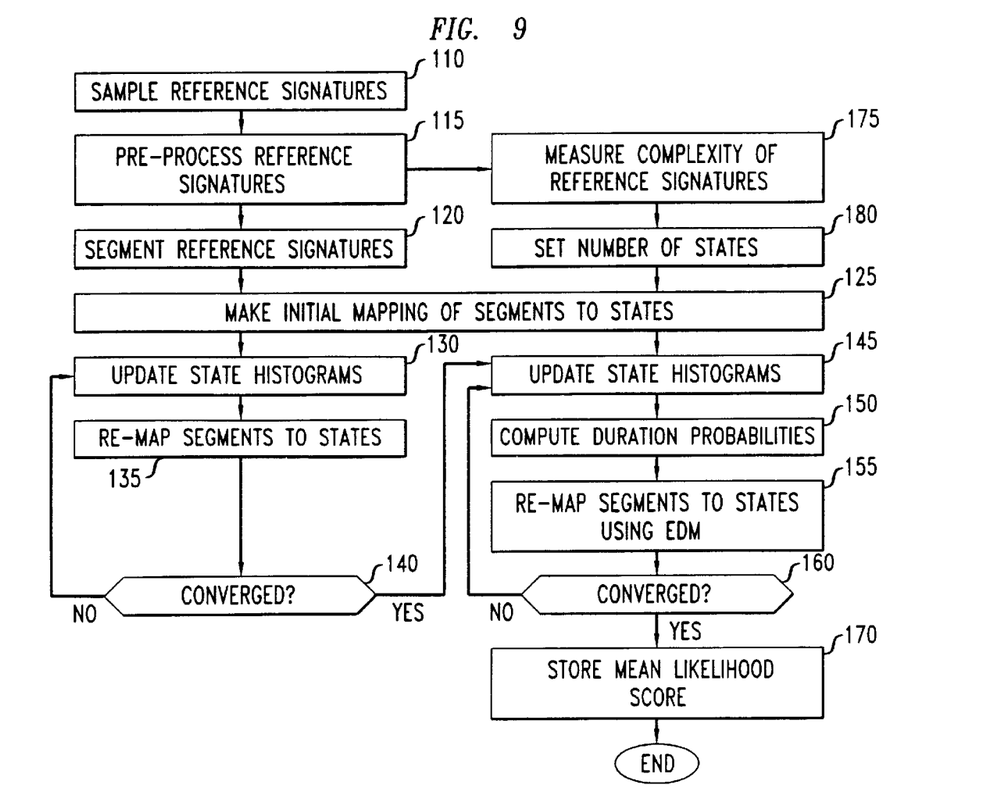
FIG. 9 is a flow chart of a training procedure in accordance with the invention in certain embodiments.

Our training procedure is now described with reference to FIG. 9. There is broad discretion in choosing the number of reference signatures to use in the training set. However, an excessive number of signatures is undesirable because it may be regarded as burdensome by the person who is providing the signatures. By way of example, we have found that a reference set of six signatures is generally sufficient, without placing an undue burden on the person who is providing them.

Each known signature in the reference set is digitally sampled (step 110), pre-processed (step 115), and segmented (step 120) substantially as discussed above. Initially, an equal number of signature segments is mapped (step 125) to each state. Then, based on the current mapping, the state-conditional histograms are updated (step 130), and this updated information is used with the Viterbi algorithm to create (step 135) a new mapping of segments to states. Up to this point, no account is taken of duration probabilities. That is, state durations are permitted to vary without affecting the likelihood score.

In each iteration, the use of the Viterbi algorithm tends to improve the mean log-likelihood score over the training set.

At step 140, a convergence criterion is applied. Each application of the Viterbi algorithm generates a log-likelihood score for each of the training signatures. At step 140, the mean of these scores, under the current version of the hidden Markov model, is compared to the previous mean. Convergence is declared if the difference is smaller than a threshold. In our experiments, we have typically found convergence after 5–7 iterations.

If convergence is not declared, the procedure returns to step 130 for a further iteration. If convergence is declared, the state-conditional histograms are again updated (step 145). At step 150, the duration probabilities are computed for the first time. As noted, we treat these probabilities as constant between a lower bound $\tau_i$ and an upper bound $T_i$. Thus, at step 150, we set $\tau_i$ to the smallest duration of state i that appears in the training set (under the current version of the hidden Markov model), and we set $T_i$ to the longest duration that appears in the training set.

In accordance with an optional adaptive loop, the segments are again re-mapped to states at step 155, but this time the duration probabilities are taken into account. At step 160, a convergence criterion, similar to the convergence criterion of step 140, is applied. If convergence is declared, the mean log-likelihood score over the reference set is stored (step 170). If convergence is not declared, the procedure returns to step 145 for a further iteration.

However, our investigations have shown little or no further advantage resulting from this optional adaptive loop. Therefore, in our current implementation, the processing proceeds from step 150 to step 170.

We have found that an advantageous reduction in the rates of false acceptance and false rejection can be obtained when the number of distinct states in the hidden Markov model is permitted to vary between signature classes. Thus, FIG. 9 shows, at box 175, a step of measuring the complexity of the reference signatures (taken from a particular person). An exemplary measure of complexity is the number of local curvature maxima in the smoothed signature. At box 180, the number of states in the hidden Markov model is set, in response to the result of step 175.

By way of example, the complexity measure is used to adjust a basic number, such as 20, of states. The median complexity measure over the training signatures of all registered persons is estimated. Individual signature classes that fall at or near this median complexity are modeled with the basic number, e.g. 20, of states. The number of states is increased for signature classes of greater complexity, and decreased for signature classes of less complexity. Any given signature class is modeled with a number of states within an established range, such as 10–30.

EXAMPLE

Our test database consisted of 542 genuine signatures and 325 forgeries. Each reference set consisted of the first six signatures entered by one of 59 subjects. Forgeries, in at least one set of five for each subject, were provided by volunteers who first had an opportunity to study the subject's signature and to practice forging it. Our hidden Markov model had twenty states.

Figure 10:
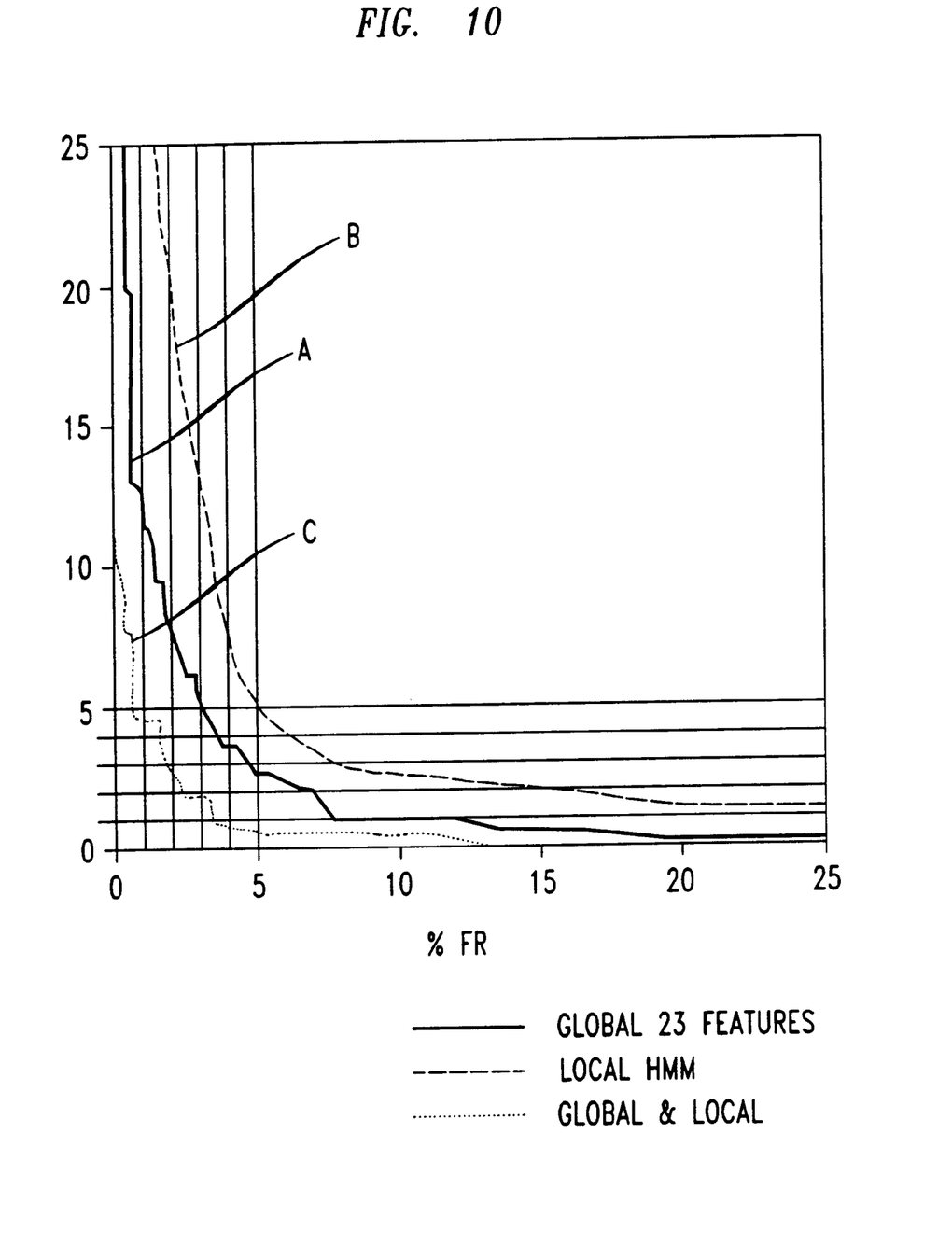
FIG. 10 is a graph of test data showing the false acceptance (FA) rate versus the false rejection (FR) rate over a test database for three signature verification techniques. Curve A is for matching only to global features. Curve B is for verification only with HMM modeling in accordance with the invention. Curve C is for a combination of both techniques.

FIG. 10 shows the false acceptance (FA) rate versus the false rejection (FR) rate over the test database. Curve A is for matching only to the 23 global features described above. Curve B is for verification only with the (local) HMM log-likelihood score.

Curve C shows the performance when these techniques were combined. The combined error was the Euclidean combination of the global error score and the HMM log-likelihood score. We found qualitatively similar results when the combined score was the geometric or harmonic combination of these individual scores.

It is evident from the figure that the equal-error rate was about 5% for local-only matching (curve B), about 3.5% for global-only matching (curve A), and about 2.5% for the combination.

We found that a useful amount of discrimination between genuine signatures and forgeries is provided with as few as ten states in the hidden Markov model. However, we found that as the number of states increases over twenty, further improvement in performance is relatively small. Therefore, because storage requirements and training time both increase with the number of states, our studies indicate that it will generally be desirable to use no more than about thirty states.

What is claimed is:

1. A method for processing a set of at least two training signatures provided by a person, leading to a stored model of the class of signatures made by said person, the method comprising, for each said signature:

receiving a digitally sampled signature signal and storing it as a raw signature;

smoothing and normalizing the raw signature and storing the result as a preprocessed signature;

dividing the pre-processed signature into segments;

evaluating at least one observable on each said segment, thereby to obtain a respective feature value; and mapping each segment to a particular state of a hidden Markov model according to a rule, wherein:

the rule tends to maximize the likelihood that the respective feature values were generated by a sequence of states defined by said mapping, and there are more segments than there are states, so that each signature will have more than unit duration in at least some states;

the method further comprising:

storing, as part of said model, a statistical distribution over the training signatures of the feature values corresponding to at least one said observable;

CHARACTERIZED IN THAT the method further comprises:

storing as part of said model, a statistical distribution over the training signatures of the duration in each of the states.

2. The method of claim 1, wherein the at least one observable comprises a quantized inclination angle for each segment.

3. The method of claim 2, wherein the at least one observable further comprises a quantized difference between the inclination angle of a given segment, and the inclination angle of the next segment.

4. The method of claim 1, wherein the statistical distribution of duration has a constant value over the range of durations that occur in the set of training signatures, and a substantially smaller value outside of said range.

5. The method of claim 1, wherein the mapping of segments is performed in an iterative process that tends to improve a mean likelihood score over the set of training signatures, in each iteration, until said mean score satisfies a convergence test.

6. The method of claim 1, further comprising measuring the complexity of the training signatures, and setting the number of states in response to said measurement.

7. The method of claim 6, wherein said complexity measurement comprises counting the number of local curvature maxima in each of the preprocessed training signatures.

8. The method of claim 1, wherein the mapping of segments comprises computing a likelihood score for the feature values corresponding to at least one said observable.

9. The method of claim 8, wherein the likelihood score, expressed logarithmically, accrues an additive increment equal to log b(k) for each instance of feature value k within a given state, wherein b(k) is a probability, conditional on the given state, of occurrence of feature value k.

10. The method of claim 8, wherein there are two or more observables, and the mapping of segments further comprises computing a joint likelihood score by multiplying together the likelihood scores corresponding to the respective observables.

11. A method for verifying a signature provided by a person, comprising:

receiving a digitally sampled representation of the signature and storing said representation as a raw signature;

smoothing and normalizing the raw signature and storing the result as a preprocessed signature;

dividing the pre-processed signature into segments;

evaluating at least one observable on each said segment, thereby to obtain a respective feature value;

mapping each segment to a particular state of a hidden Markov model according to a rule, wherein:

the rule tends to maximize a score related to the likelihood that the respective feature values were generated by a sequence of states defined by said mapping, and there are more segments than there are states, so that each signature will have more than unit duration in at least some states;

performing a threshold test based, at least in part, on said score; and in response to the threshold test, generating an indication of acceptance or rejection of the signature;

CHARACTERIZED IN THAT the method further comprises including in the score, for each of said states, a factor that explicitly takes account of the duration of the signature in said state.

12. The method of claim 11, wherein the score, expressed logarithmically, accrues for each state an additive increment equal to log p(d), wherein p(d) is a probability, conditional on the given state, that duration in the given state is equal to d.

13. The method of claim 12, wherein, for each state, p(d) has a constant value over the range of durations that occur in a set of training signatures, and a substantially smaller value outside of said range.

14. The method of claim 11, wherein the at least one observable comprises a quantized inclination angle for each segment.

15. The method of claim 14, wherein the at least one observable further comprises a quantized difference between the inclination angle of a given segment, and the inclination angle of the next segment.

16. The method of claim 11, wherein the score, expressed logarithmically, accrues an additive increment equal to log b(k) for each instance of feature value k within a given state, wherein b(k) is a probability, conditional on the given state, of occurrence of feature value k.

17. The method of claim 11, wherein:

there are two or more observables;

said score is a joint likelihood score;

and the joint likelihood score is computed by multiplying together individual likelihood scores corresponding to the respective observables.

18. A method for processing a set of at least two training signatures provided by a person, leading to a stored model of the class of signatures made by said person, the method comprising, for each said signature:

receiving a digitally sampled signature signal and storing it as a raw signature;

smoothing and normalizing the raw signature and storing the result as a pre-processed signature;

dividing the pre-processed signature into segments;

evaluating at least one observable on each said segment, thereby to obtain a respective feature value; and mapping each segment to a particular state of a hidden Markov model according to a rule, wherein:

the rule tends to maximize the likelihood that the respective feature values were generated by a sequence of states defined by said mapping, and there are more segments than there are states, so that each signature will have more than unit duration in at least some states;

CHARACTERIZED IN THAT the method further comprises:

measuring the complexity of the training signatures, and setting the number of states in response to said measurement.

19. The method of claim 18, wherein said complexity measurement comprises counting the number of local curvature maxima in each of the pre-processed training signatures.

* * * * *